United States Patent [19]
Doyle et al.

[11] Patent Number: 4,989,092
[45] Date of Patent: Jan. 29, 1991

[54] PICTURE DISPLAY DEVICE USING SCAN DIRECTION TRANSPOSITION

[75] Inventors: Terence Doyle; Leendert Vriens; Matheus J. G. Lammers, all of Eindhoven, Netherlands

[73] Assignee: U. S. Philips Corporation, New York, N.Y.

[21] Appl. No.: 442,081

[22] Filed: Nov. 28, 1989

[30] Foreign Application Priority Data

Dec. 7, 1988 [NL] Netherlands .................. 8802998

[51] Int. Cl.$^5$ .................................................. H04N 7/01
[52] U.S. Cl. ...................................... 358/140; 358/138; 358/160; 358/242
[58] Field of Search ................. 358/140, 138, 242, 160

[56] References Cited

U.S. PATENT DOCUMENTS

| | | | |
|---|---|---|---|
| 2,960,566 | 11/1960 | Athey | 358/140 |
| 3,342,937 | 9/1967 | Deutsch | 358/138 |
| 4,449,143 | 5/1984 | Dischert | 358/140 |
| 4,451,852 | 5/1984 | Masuda | 358/242 |
| 4,472,732 | 9/1984 | Bennett | 358/160 |
| 4,672,449 | 6/1987 | Kraus | 358/148 |

Primary Examiner—Howard W. Britton
Attorney, Agent, or Firm—Michael E. Marion

[57] ABSTRACT

In a picture display device suitable for receiving and processing an incoming video signal which comprises horizontally scanned picture information and for displaying pictures which are composed of fields each of which comprises a given number of lines, a scanning section for generating line and field scanning signals for forming the lines and fields, respectively, is adapted to scan the lines in the vertical direction, a number of vertical lines constituting a field and the vertical line frequency being many times higher, at least 200 times, than the horizontal field frequency. A video signal processing section for processing the picture information which is present in the video signal comprises a scan direction transposition circuit for receiving the picture information and for sequentially assigning picture information to elements of the vertically scanned lines.

36 Claims, 2 Drawing Sheets

PICTURE DISPLAY DEVICE USING SCAN DIRECTION TRANSPOSITION

BACKGROUND OF THE INVENTION

The invention relates to a picture display device suitable for receiving and processing an incoming video signal which comprises horizontally scanned picture information and for displaying pictures which are composed of fields each of which comprises a given number of lines, said device comprising a scanning section for generating line and field scanning signals for forming the lines and fields, respectively, and a video signal processing section for processing the picture information which is present in the video signal.

In such commonly known picture display devices the picture is formed in that lines are substantially horizontally scanned from left to right, for example on the display screen of a picture display tube, while picture information is applied to electrodes of the tube. Thus, picture information is assigned to the elements of the horizontally scanned lines. The successive lines are scanned from top to bottom so that a given number of lines forms a field. A frame comprises two or more fields, or, alternatively, a picture is formed by one field. For example, according to the European television broadcasting standard a frame is composed of 2 interlaced fields of $312\frac{1}{2}$ lines each, the field frequency being 50 Hz and the line frequency being 15,625 Hz. Scanning at the signal source in the studio is identical to scanning upon display. This is ensured by synchronizing signals which are transmitted together with the picture information.

In picture display devices for displaying digitally generated text, so-called monitors, the line frequency may be higher than the frequency prescribed by a television standard. So-called high-definition television (HDTV) systems are also proposed in which the line frequency in the display device is very high, for example 62.5 kHz, which is 4 times as high as the line frequency in the current television standard. As a result, the energy dissipation in the line scanning circuits, i.e. losses caused by eddy currents, by the hysteresis of magnetic materials and in switching elements, is considerably larger. The dissipation at the line deflection in a cathode ray tube has been described for different values of the line frequency in the Article "Practical Considerations in the Design of Horizontal Deflection Systems for High-Definition Television Displays", published in the journal "IEEE Transactions on Consumer Electronics", Vol. CE-29, No. 3, Aug. 1983, pp. 334 to 349. It appears from this publication that an increase of the line frequency from 15.75 kHz (American television standard) to 63 kHz at an aspect ratio of 4:3 of the displayed image and a 110° cathode ray tube with a final anode voltage of 30 kV leads to an increase of the transistor losses from 1.4 to 4.3 W to 35 to 165 W (dependent on the turn-off time), while the total losses in the deflection yoke increase from 7.5 W to 40 to 50 W and the losses caused by the eddy currents and the hysteresis increase from approximately 3.5 to 36 to 46 W (dependent on the yoke material). These figures show the importance of the problem posed by the dissipation.

SUMMARY OF THE INVENTION

It is an object of the invention to provide a picture display device of the type described above in which the energy dissipation in the scanning circuits is considerably smaller than in the known devices. To this end a device according to the invention is characterized in that the scanning section is adapted to scan the lines in the vertical direction, a plurality of vertical lines constituting a field, the vertical line frequency being many times higher, at least 200 times, than the horizontal field frequency, the video signal processing section comprising a scan direction transposition circuit for receiving the picture information and for sequentially assigning picture information to elements of the vertically scanned lines.

Due to this measure the scan directions are transposed, the lines being scanned vertically, preferably from top to at the highest scanning frequency, namely the line frequency, and the horizontal scanning, preferably from left to right, at the lowest scanning frequency, namely the field frequency. The invention is based on the recognition that in the case of vertical line scanning the high-frequency scanning is effected at a scanning angle and thus at an amplitude which are smaller than the corresponding values for horizontal line scanning, so that the dissipation is considerably reduced. Moreover, for vertical line scanning it is possible to use scanning systems in which the line scan rate is decreased so that the generated magnetic fields vary more slowly than is otherwise the case, the dissipation being thus still further reduced.

It is to be noted that such a vertical line scanning upon picture display has been proposed in U.S. Pat. No. 4,449,143 as part of a novel high-definition television system. However, the line scan direction is the same, i.e. vertical, in the picture display tube as well as in the pick-up tube so that the system proposed in the said Patent is not compatible with the existing systems for generating and transmitting video signals. In contradistinction thereto, a picture display device according to the invention is suitable for receiving horizontally scanned video signals like substantially all existing monitors and television receivers, the said scan direction transposition being effected upon display. The compatibility with the existing systems is thus maintained with the scanning transposition proposed according to the invention.

The horizontal field frequency upon display is preferably equal to the vertical field frequency in the incoming video signal, or it is equal to a small, single-digit multiple of this frequency. Consequently, the scanning system is certainly compatible with the transmission system. The vertical line frequency upon display is advantageously higher than, and no integral multiple of, the horizontal line frequency in the incoming video signal. This enhances the resolution.

In a preferred embodiment of a picture display device according to the invention, in which a line comprises picture information during the line trace time and no picture information during the line retrace time, the picture display device is characterized in that upon display the ratio between the line retrace time and the line period is at least substantially equal to the corresponding ratio in the incoming video signal. The advantage of this measure is that the energy dissipation is not increased due to a too small retrace ratio.

The compatibility with the scanning system according to the incoming video signal is even better if a picture display device according to the invention is characterized by a first clock signal for sampling the incoming video signal and by a second clock signal for controlling the scan direction transposition circuit for assigning picture information to elements of the vertical lines, the frequency of the second clock signal being substantially equal to the frequency of the first clock signal or to a small, single-digit multiple of this frequency. Moreover, if the number of samples with picture information in a vertical line in the displayed picture is equal to the number of horizontal lines with picture information in the field in the incoming video signal and if the number of vertical lines with picture information in the displayed field is equal to the number of samples in a line in the incoming video signal, a scanning system is obtained which is completely compatible with the current and even future transmission standards. In this system the total numbers of lines and picture samples are not exchanged with the corresponding numbers in the original system and the distance between the scanned lines is larger than the original distance between the lines.

The invention is also important in picture display devices which have a picture display tube provided with electron guns and a spiral lens. Losses are considerably reduced in such a tube, but the bandwidth of the lens is very small. The picture display device may be advantageously characterized by a stage for receiving a field scan signal and for applying a horizontal dynamic correction signal to a focusing electrode of the picture display tube. The horizontal dynamic focusing, i.e. the largest correction which must be performed, is effected at the lowest scan frequency. Consequently, the dissipation is still further reduced.

The scan direction transposition circuit according to the invention may comprise two memories and two address generators each for addressing a memory, the incoming picture information being written in a memory in the order of arrival under the control of the second clock signal during one field period, while the picture information stored in the other memory is being read from this memory in a direction perpendicular to the write direction. The memories may be utilized for doubling the field frequency so that the picture quality is improved considerably. Such memories already exist in devices for an improved quality and thus have a dual function.

BRIEF DESCRIPTION OF THE DRAWINGS

The invention will be described in greater detail by way of example with reference to the accompanying drawings in which.

DETAILED DESCRIPTION OF A PREFERRED EMBODIMENT OF THE INVENTION

Figure 1A:
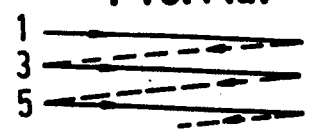
FIG. 1(a) shows an odd field of one frame of a horizontal scanning system.
Figure 1B:
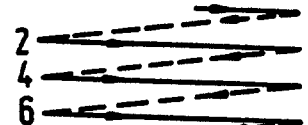
FIG. 1(b) shows an even field of the frame referred to in FIG. 1(a)

FIGS. 1(a) and 1(b) respectively show two fields forming a frame of a known scanning system, for example the system according to the European television broadcasting standard. The picture display device according to the invention is suitable for receiving and processing the relevant video signal. In known picture display devices 625 horizontal lines per frame are scanned with reference to this signal at a field frequency of 50 Hz and a line frequency of 15,625 Hz. Since the vertical movement is superimposed on the horizontal movement, the lines are actually not quite horizontal. This effect is greatly exaggerated in the Figure. The scanning is interlaced, i.e. the odd lines are scanned during the first 20 ms of a frame period of 40 ms and the even lines are scanned during the subsequent 20 ms, the lines of a field being equidistantly positioned between the lines of the previous field.

A scanning system may be characterized by the following parameters:

P: the number of samples per line,

N: the number of lines per frame or picture, respectively,

M: the field frequency and

L: the L:1 interlace factor.

The picture frequency is equal to M/L and the line frequency $f_l$ is equal to NM/L. It is assumed that the incoming video signal is sampled by a clock signal so that the lines can be considered to be composed of a collection of discrete picture elements. The clock signal frequency $f_c$ is equal to $P \times f_l$. Other parameters are:

N': the number of active lines per frame or picture and

P': the number of active samples per line.

An active line is a line comprising picture information and being scanned in the field trace time, i.e. in the time when the field is visible, and an active sample is a sample taken during the line trace time, i.e. in the time when the line comprises picture information and is visibly scanned. No picture information is visible in the line and field retrace times. For the considered scanning system S(a) it holds that:

| N | = | 625   | L     | = | 2          |
|---|---|-------|-------|---|------------|
| M | = | 50 Hz | $f_l$ | = | 15,625 Hz. |

$f_c$ is equal to, for example 13.5 MHz in accordance with a recommendation by the Comité Consultatif International des Radiocommunications (CCIR), so that P=864. N' is generally equal to 575 so that the ratio between the field retrace time and the field period is equal to (625−575)/625=0.08. The duration of the line trace time is approximately 52 μs for a line period of 64 μs so that the ratio between the line retrace time and the line period is equal to (64−52)/64=0.1875. The ratio between the number of inactive samples per line and P is equal to this value so that P'=702.

Similarly as in FIG. 1, a scanning system S(b) can be considered which has been proposed for reducing the flicker caused by the low field frequency and which is derived from the system S(a) according to the European television standard by doubling the field frequency upon display while maintaining the number of lines. The parameters of this system are:

| N | = | 625    | $f_l$ | = | 31,250 Hz |
|---|---|--------|-------|---|-----------|
| M | = | 100 Hz | $f_c$ | = | 27 MHz    |
| L | = | 2      | N'    | = | 575       |
| P | = | 864    | P'    | = | 702.      |

Subsequently a scanning system S(c) in accordance with a so-called high-definition (HDTV) system is considered in which the number of lines per frame and the number of samples per line are doubled with respect to the system S(a). For this system it holds that:

| | | | | | |
|---|---|---|---|---|---|
| N | = | 1250 | $f_1$ | = | 31,250 Hz |
| M | = | 50 Hz | $f_c$ | = | 54 MHz |
| L | = | 2 | N' | = | 1152 |
| P | = | 1728 | P' | = | 1404. |

If also in this case the field frequency is doubled, a fourth scanning system (d) is obtained for which it holds that:

| | | | | | |
|---|---|---|---|---|---|
| N | = | 1250 | $f_1$ | = | 62,500 Hz |
| M | = | 100 Hz | $f_c$ | = | 108 MHz |
| L | = | 2 | N' | = | 1152 |
| P | = | 1728 | P' | = | 1404. |

In accordance with a proposal lodged with CCIR the number $1152 = 2 \times 576$ instead of 1150 has been introduced.

In this way four modifications of a scanning system S are described, in which the line scanning upon reception of a video signal with horizontally scanned picture information is effected horizontally because a signal according to (a) is received and subsequently converted in known manner into (b), (c) or (d) in the picture display device.

Figure 2A:
FIG. 2(a) shows an odd field of one frame of a vertical scanning system.
Figure 2A:
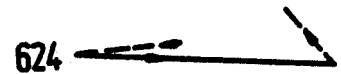
Figure 2A:
Figure 2A:
Figure 2A:
Figure 2B:
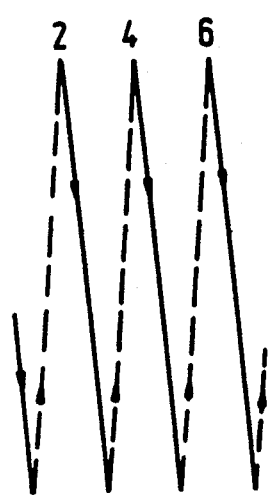
FIG. 2(b) shows an even field of the frame referred to in FIG. 2(a).
Figure 2B:

FIGS. 2(a) and 2(b) respectively show two fields of a scanning system which is derived from the incoming video signal for display in a picture display device according to the invention, in which the lines are scanned vertically and a number of lines constitute a field. Since the horizontal movement is superimposed on the vertical movement, the lines are not exactly vertical, which effect is greatly exaggerated in FIG. 2. In FIG. 2 this scanning is also assumed to be interlaced. The vertical scanning is now effected at the highest of the two scanning frequencies and the horizontal scanning is effected at the lowest of the two scanning frequencies. Since the vertical lines are scanned at a smaller angle as compared with the scanning of horizontal lines, or in other words, since the amplitude of the scanned lines is smaller, the energy consumption can be reduced considerably in the case of vertical line scanning. A number of scanning systems can be conceived, dependent on the choice of several parameters.

A first group S1 of scanning systems is derived from the group S of scanning systems described with reference to FIG. 1 because the following parameters remain unchanged: the distance between the scanned lines and the line and field retrace ratios. Consequently, in shadow mask display tubes the average loading on the shadow mask and on the phosphors substantially does not change. If system S1 satisfies the requirement that it is compatible with the transmitted scanning system, the field period does not change so that the condition of the distance between the lines being unchanged implies that the line scan rate is also unchanged. In the case of an aspect ratio of 16:9 of the displayed image, i.e. a format proposed for future television standards, the choice made implies that the number of vertical lines is equal to $N \times 16/9 = N \times 1.778$, in which N is the number of horizontal lines of the original system. The number of samples per line is $P \times 9/16$. The parameters M, L and $f_c$ remain unchanged. Under these circumstances the parameters of a system S1(a) derived from the above-described system S(a) are the following:

| | | | | | |
|---|---|---|---|---|---|
| N | = | 1111 | $f_1$ | = | 27,778 Hz |
| M | = | 50 Hz | $f_c$ | = | 13.5 MHz |
| L | = | 2 | N' | = | 1022 |
| P | = | 486 | P' | = | 395 |

Similarly as described above, systems S(b, c and d) can be converted. For a system S1(d) which is derived from the system S(d) it holds that:

| | | | | | |
|---|---|---|---|---|---|
| N | = | 2222 | $f_1$ | = | 111,111 Hz |
| M | = | 100 Hz | $f_c$ | = | 108 MHz |
| L | = | 2 | N' | = | 2044 |
| P | = | 972 | P' | = | 790. |

A second group S2 of scanning systems is obtained by choosing the number of samples P per vertical line to be equal to the number of horizontal lines in the incoming video signal while maintaining the clock frequency $f_c$ or a small multiple thereof and by choosing the number of vertical lines N to be equal to the number of samples in this signal. Under these circumstances the parameters of a system S2(a) which is derived from the system S(a) are the following:

| | | | | | |
|---|---|---|---|---|---|
| N | = | 864 | $f_1$ | = | 21,600 Hz |
| M | = | 50 Hz | $f_c$ | = | 13.5 MHz |
| L | = | 2 | N' | = | 702 |
| P | = | 625 | P' | = | 575. |

Similarly as described for the systems S1 three other systems can be derived from the above-described systems S(b, c and d), while it holds for the last system, S2(d) which is derived from S(d) that:

| | | | | | |
|---|---|---|---|---|---|
| N | = | 1728 | $f_1$ | = | 86,400 Hz |
| M | = | 100 Hz | $f_c$ | = | 108 MHz |
| L | = | 2 | N' | = | 1404 |
| P | = | 1250 | P' | = | 1152. |

A drawback of the scanning systems S2 obtained is that the line retrace ratio is considerably reduced with respect to the original value of 0.1875. In fact, the new ratio is equal to $(625-575)/625$ for the system S2(a) and to $(1250-1152)/1250$ for the system S2(d), i.e. 0.08 in both cases. This causes a considerable increase of the energy dissipation, which reduces the energy advantage provided by the vertical line scanning.

A third group S3 of scanning systems is obtained by choosing the number of active samples per vertical line to be equal to the number of active horizontal lines in the incoming video signal while substantially maintaining frequency $f_c$ or a small multiple thereof and by choosing the number of active vertical lines to be equal to the number of active samples in this signal, but this time at substantially the same line and field retrace ratios, i.e. 0.1875 and 0.08, respectively, as in the original systems. Under these circumstances N' (active lines) is equal to 702 and P' (samples per line) is equal to 575 in a system S3(a) which is derived from the system S(a), from which follows that N=763 and P=708. Similarly as described above, five systems can be distinguished:

(a)  N = 763      $f_l$ = 19,075 Hz
    M = 50 Hz    $f_c$ = 13.505 MHz
    L = 2        N' = 702
    P = 708      P' = 575.
(b) = (a) + doubled field frequency:
    N = 763      $f_l$ = 38,150 Hz
    M = 100 Hz   $f_c$ = 27.01 MHz
    L = 2        N' = 702
    P = 708      P' = 575.
(c) = (a) + doubled number of lines per picture:
    N = 1526     $f_l$ = 38,150 Hz
    M = 50 Hz    $f_c$ = 54.02 MHz
    L = 2        N' = 1404
    P = 1416     P' = 1152.
(d) = (a) + doubled field frequency and doubled line number:
    N = 1526     $f_l$ = 76,300 Hz
    M = 100 Hz   $f_c$ = 108.04 MHz
    L = 2        N' = 1404
    P = 1416     P' = 1152.
(e) = (a) non-interlaced:
    N = 763      $f_l$ = 38,150 Hz
    M = 50 Hz    $f_c$ = 27.01 MHz
    L = 1        N' = 702
    P = 708      P' = 575.

Due to the unchanged retrace ratios the average loading on the shadow mask and on the phosphors of the picture display tube is substantially the same as in the original systems. An important result of the choice made is that the distance between the lines is larger than in the original systems, namely by a factor of $16/9 \times 575/702 = 1.456$ in the case where the aspect ratio of the displayed picture is 16:9 and by a factor of 1.092 in the case where the said ratio is 4:3. For high-definition applications the number of active vertical lines is 1404. Since the systems S3(a, b, c and d) are compatible with the corresponding system of the incoming video signal, the scanning duration is the same, resulting in the line scan rate with respect to the systems S being smaller by the same factor 1.456 (at a ratio of 16:9) and 1.092 (at 4:3), respectively, so that the generated magnetic fields vary more slowly and the dissipated energy is reduced. This energy benefit adds to the advantage provided by the vertical line scan. It is apparent therefrom that among the described scanning systems the systems S3 are to be preferred. In the system S1 the number of lines and also the line frequency are considerably increased and the number of picture element per vertical line is decreased, which number is not equal to the number of horizontal lines in the incoming signal. In the picture display device two interpolations must therefore be carried out, which requires a complicated signal processing operation. The systems S2 have the above-mentioned drawback of the shorter line retrace time and are therefore less attractive than the system S3.

A modification S3' of the above-described group of scanning systems S3 follows from the following consideration. With the original scanning, NPM/L is equal to 13,500,000 Hz, but in the systems S3 the product NP is not an exact multiple of the product NP before transposition, namely NPM/L = k × 13,505,100, in which k is an integer. This need not be a great problem because the number N of displayed lines and the number P of pixels are exchanged, but a small modification of S3 leads to a still better compatibility with the incoming system S. This is achieved by modifying the number N of transposed lines of 763 and 1526 in S3 into 750 and 1500, respectively, and by modifying the number P of picture samples per line of 708 and 1416 into 720 and 1440, respectively. In the resultant system S3' NPM/L is equal to k × 13,500,000 and the line frequency $f_l$ is equal to 18,750, 37,500 and 75,000 Hz, respectively. As compared with the systems S3, N and $f_l$ are reduced by 1.7% and the line retrace ratio is increased to 0.2014. Both effects cause a further reduction of the energy dissipation. Thus it appears that of all scanning systems described the systems S3' are to be preferred. It will be noted that in all scanning systems S1, S2, S3 and S3' considered the line frequency is many times higher, at least 200 times, than the field frequency and that the total number NP of picture elements and the total number N'P' of active elements is equal or substantially equal to the corresponding number in the scanning system S from which the considered system has been derived. For example, for the scanning system S3'(a) it holds that:

$$NP = 750 \times 720 = 540,000 \text{ and}$$

$$N'P' = 702 \times 575 = 403,650,$$

while for S(a) it holds that:

$$NP = 625 \times 684 = 540,000 \text{ and}$$

$$N'P' = 575 \times 702 = 403,650.$$

Similarly as described in the foregoing, other incoming scanning systems S can be considered, particularly systems which are based on the American system using 525 lines per picture and a field frequency of 59.94 Hz. The American system S(a) according to the NTSC television standard has the following parameters:

| N = 525 | $f_l$ = 15,734 Hz |
|---|---|
| M = 59.94 Hz | $f_c$ = 13.5 MHz |
| L = 2 | N' = 485 |
| P = 858 | P' = 711. |

In this case the sampling frequency $f_c$ is the same as for the European standard. A modification S(b) is a non-interlaced system with the same field frequency as S(a):

| N = 525 | $f_l$ = 31,468 Hz |
|---|---|
| M = 59.94 Hz | $f_c$ = 27 MHz |
| L = 1 | N' = 485 |
| P = 858 | P' = 711. |

For another modification S(c) it holds that:

| N = 525 | $f_l$ = 62,937 Hz |
|---|---|
| M = 119.88 Hz | $f_c$ = 54 MHz |
| L = 1 | N' = 485 |
| P = 858 | P' = 711. |

In this system the field frequency is doubled with respect to that in system S(b). Finally, in a high-definition display system S(d), the number of lines per picture is doubled as compared with that in S(a):

| N = 1050 | $f_l$ = 62,937 Hz |
|---|---|
| M = 119.8 Hz | $f_c$ = 108 MHz |
| L = 2 | N' = 970 |
| P = 1716 | P' = 1422. |

Similarly as for the European systems, systems for the vertical line scanning can now be derived. Since the systems S1 and S2 are less attractive than the systems S3, only these last-mentioned systems are considered for USA, in which the number of active lines and the number of active picture elements per line are exchanged with respect to the systems S and the retrace ratios and the clock signal frequency remain unchanged. The parameters of the scanning systems obtained are the following:

| (a) | $N$ = 770 | $f_1$ = 23,077 Hz |
|---|---|---|
| | $M$ = 59.94 Hz | $f_c$ = 13.5 MHz |
| | $L$ = 2 | $N'$ = 711 |
| | $P$ = 585 | $P'$ = 485 |
| (b) | $N$ = 770 | $f_1$ = 46,154 Hz |
| | $M$ = 59.94 Hz | $f_c$ = 27 MHz |
| | $L$ = 1 | $N'$ = 711 |
| | $P$ = 585 | $P'$ = 485. |
| (c) | $N$ = 770 | $f_1$ = 92,308 Hz |
| | $M$ = 119.88 Hz | $f_c$ = 54 MHz |
| | $L$ = 1 | $N'$ = 711 |
| | $P$ = 585 | $P'$ = 485. |
| (d) | $N$ = 1540 | $f_1$ = 92,308 Hz |
| | $M$ = 119.88 Hz | $f_c$ = 108 MHz |
| | $L$ = 2 | $N'$ = 1422 |
| | $P$ = 1170 | $P'$ = 970. |

Here the distance between the lines is also larger than in the original systems, namely by a factor of $16/9 \times 485/711 = 1.213$ at an aspect ratio of 16:9. For high-definition applications the number of active lines is 1422. It is to be noted that an improvement for America of the systems S3 as described for Europe, resulting in a group S3' of scanning systems, is not possible because the products NP are already exact multiples of the corresponding products in the original systems S.

Figure 3:
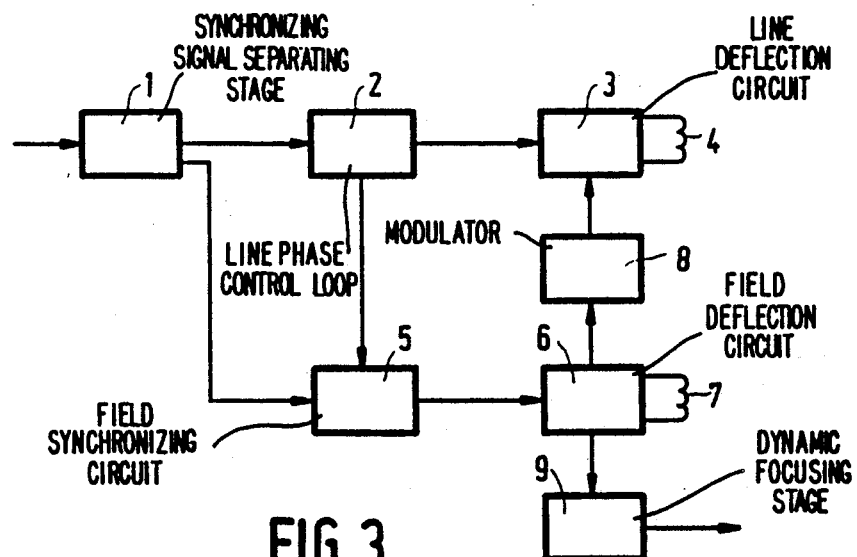
FIG. 3 shows the diagram of the scanning section of a picture display device according to the invention, for example a television receiver.

FIG. 3 shows in a block-schematic diagram the scanning section of a picture display device according to the invention, which is suitable for receiving and processing an incoming video signal with horizontally scanned picture information, for example in accordance with the scanning system S(a) considered above for the European television standard, and for transposing the scan directions so that scanning is effected in accordance with one of the scanning systems S3' upon display, for example the system S3'(a). The incoming video signal is applied to a synchronizing signal separating stage 1 of known type. A line synchronizing signal is present at an output of stage 1 and is applied to a line phase control loop 2. The control loop controls a clock signal in known manner, whose nominal frequency $f_c$ is equal to 13.5 MHz. Synchronizing and blanking signals are derived from the output signals thereof, for example by means of a counter, which signals are required at a number of places in the picture display device. One of these signals has a frequency which is the $864^{th}$ part of the clock signal frequency. In the synchronized state of the control loop this signal has the (line) frequency of 15.625 kHz of the line synchronizing signal in the incoming video signal and substantially the same phase. Another output signal of the counter has a frequency which is the $720^{th}$ part of the clock signal frequency, i.e. nominally $f_1 = 18.75$ kHz. It is applied to a line deflection circuit 3 of known type to which a line deflection coil 4 is connected. A line deflection current of the frequency $f_l$ flows through the coil, which current generates a magnetic field for vertically deflecting one or more electron beams in a picture display tube (not shown). A field synchronizing signal is present at a second output of stage 1. An output signal of loop 2 has a frequency which is the $625^{th}$ part of twice the line frequency, i.e. nominally 50 Hz. It is applied to a field synchronizing circuit 5 of known type in which it is compared in phase with the field synchronizing signal from stage 1. The output signal of circuit 5 has the (field) frequency of the field synchronizing signal in the incoming video signal and substantially the same phase. It is applied to a field deflection circuit 6 of known type to which a field deflection coil 7 is connected. A field deflection current flows through the coil which current generates a magnetic field for deflecting the electron beam(s) in the horizontal direction.

The scanning section of the picture display device according to the invention also comprises circuits for correcting deflection errors, particularly for correcting the raster distortion. The north-south correction, i.e. at the top and bottom of the displayed picture, is performed by means of a field frequency amplitude modulation of the vertical line deflection current, the field frequency envelope being parabola-shaped in the case of pincushion distortion. For this purpose a modulator 8 of known type is connected to the line deflection circuit 3, which modulator receives the suitable modulating signal from the horizontal field deflection circuit 6. The east-west correction, i.e. at the left and right of the displayed picture, is performed by means of a circuit for superimposing a line frequency current on the field deflection current or by means of a non-linear distribution of the turns of the horizontal deflection coil 7. For the keystone correction which is especially important in the case of projection display, a modulator must be provided for multiplying two signals each being proportional to one deflection. This holds for first-order correction terms. A second-order term for the horizontal correction has a low frequency in the case of vertical line scanning and may therefore be corrected in a simple manner, for example by means of a multipole.

Convergence errors may be corrected in a manner which can be derived in a simple manner from the correction of convergence errors in display devices using horizontal line scanning.

Advantageous use can be made of a picture display tube which is provided with electron guns with a spiral lens. With such a tube, which is known, for example from European patent application No. 233,379 in the name of the Applicant, the losses caused by eddy currents are reduced considerably, while the resolution with respect to other types of tubes is improved. However, due to the very high resistance of the material, the lens has a bandwidth of only approximately 100 Hz, which is insufficient for dynamic focusing at 15 kHz or more. Since the largest correction must be performed in the horizontal direction, the vertical line scanning provides the advantage that the dynamic focusing can take place at a low frequency. For this purpose a stage 9 receives a field frequency signal which originates from stage 6. A signal having the suitable variation is applied from stage 9 to the focusing electrode. If a line frequency correction is also required, a correction signal can be derived from stage 3 in a similar manner. This correction is small and can therefore be performed in a simple manner in spite of the high frequency.

In the foregoing the incoming scanning system is transposed into the system S3'(a). It will be obvious that the circuit of FIG. 3 can be modified in a simple way to render this circuit suitable for another scanning system of the group S3'. It will be noted that the foregoing description relates to the sawtooth-shaped line deflection, i.e. with a retrace time during which there is no display and which is much shorter than the trace time. It will be obvious that the invention need not be limited thereto and that the described vertical line scanning can also be effected symmetrically, for example sinusoidally. Such a symmetrical deflection for the horizontal line deflection is described in U.S. Pat. No. 4,672,449 in the name of the Applicant. This leads to a considerable saving in energy, which in the case of vertical line scanning adds to the saving already realised.

Figure 4:
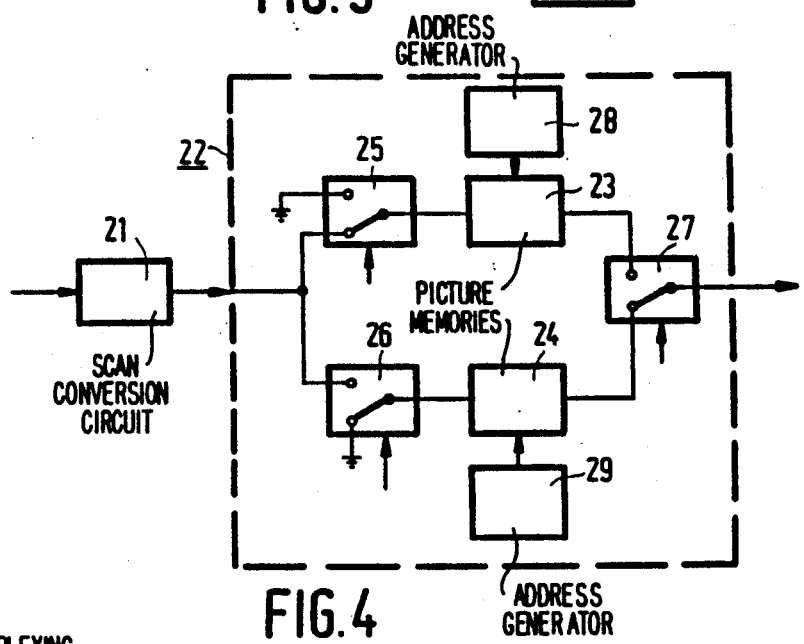
FIGS. 4 and 5 show parts of the video signal processing section of the picture display device.

The picture display device according to the invention also comprises a video signal processing section for processing the picture information which is present in the incoming video signal and the relevant part of which is shown in FIG. 4. Since the incoming video signal according to system S(a) is suitable for interlaced display, it takes two field periods before the picture elements of this signal which are located on a vertical line are received. The video signal is therefore firstly applied to a circuit 21 which receives a clock signal at the frequency of 27 MHz and in which it is converted in known manner into a non-interlaced (progressive) video signal, i.e. a signal which differs from the incoming signal in that all lines of a picture form one field (L=1), the line frequency being doubled. Without this measure the resolution in the vertical direction would be halved. Such a conversion circuit is described, for example in European patent application No. 192,292 in the name of the Applicant, which is herein incorporated by reference. The video section also comprises an A/D converter which is located for example before circuit 21. In a different manner the sampling is effected in circuit 21 itself.

The non-interlaced signal obtained is applied to a scan direction transposition circuit 22 in which the picture information of the incoming signal is sequentially assigned to elements of the scanned lines. Circuit 22 comprises two picture memories 23 and 24 whose inputs are connected to the output of circuit 21 via switching stages 25 and 26, respectively. In the position of the stages 25 and 26 shown in FIG. 4 the signal of circuit 21 is applied to memory 23 via stage 25. The picture information of the picture samples of the horizontal lines is sequentially written in memory 23 in the order of arrival. For this purpose the clock signal of the frequency 27 MHz is applied to the memory. In one field period of 20 ms the picture information of all active lines of one frame of the incoming video signal is stored in memory 23. Memory 23 thus comprises 575×702 elements. Stages 25 and 26 are then switched to the position not shown and the picture information of the next frame is written in memory 24, while the contents of memory 23 are read and are applied via a switching stage 27 to further stages (not shown) for the display by the picture tube. The scan direction is transposed from horizontal to vertical in that the memory is read in a direction perpendicular to the write direction. This is ensured by an address generator 28, with the picture information of picture elements which are located one over the other upon display being sequentially read from left to right. In the next period the contents of memory 24 are read by means of an address generator 29 and further processed, while writing is effected in memory 23. The read clock signal has a frequency of 13.5 MHz and the lines are alternately read, for example the even columns are read from memory 23 and the odd columns are read from memory 24.

Stages 25, 26 and 27 receive a switching signal at the frame frequency 25 Hz of the incoming video signal from the counter in the line control loop 2. The signal obtained after stage 27 comprises the picture information which in accordance with the scanning system S3' (a) is assigned to the displayed picture samples.

Figure 5:
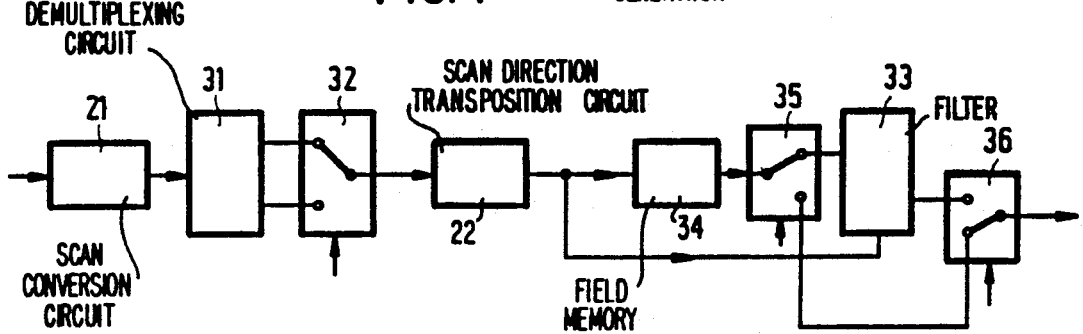

A more efficient use of the memories is obtained by using two field memories in circuit 22 instead of picture memories, and a demultiplexing circuit 31 which is arranged with a switching stage 32 between circuits 21 and 22 (FIG. 5). Circuit 31 receives two sampling signals from the counter at the clock signal frequency of 13.5 MHz, which signals are mutually opposed in phase. The first signal alternately passes on the picture information of the picture samples of the video signal at the output of circuit 21 to a first output of circuit 31 and the second signal passes on the picture information of the samples which have just been omitted to a second output of circuit 31. Stage 32 makes a field frequency selection between the said outputs for applying the obtained picture information to circuit 22. Memories 23 and 24 are field memories and comprise 575×351 elements each.

The memories may also be utilized for enhancing the picture quality because there is a transposition to a system other than S3' (a), for example to the system S3' (b) with interlaced scanning and doubled field frequency or to the system S3' (e) with non-interlaced scanning and unmodified field frequency. In both cases the line frequency is 37.5 kHz and all lines are sampled with the clock signal of 27 MHz. The number of samples per active line period of approximately 21.7 μs is 575. The read clock signal has the same frequency of 27 MHz. In the system S3' (b) the field frequency is also doubled by means of the field memories 28 and 29, for example because the incoming fields are repeatedly read in known manner. Four fields of 20 ms each are converted into eight fields of 10 ms each. Other field conversions can be performed, for example a conversion with which the average of two consecutive fields is obtained. If the memories are dynamic RAM or CCD memories, the data which have been read must be circulated. In the system S3' (e) the memories must be picture memories in which the circulation and demultiplexing are not required. The signal obtained is applied to a D/A converter (not shown) for applying the signal obtained to video amplifiers.

If there is a transposition to the system S3' (c) or to the system S3' (d), in which the number of picture elements is increased, additional interpolations must take place. The said number can be increased from 575 to 1152 before or after the scan direction transposition. By arranging a picture element interpolator between circuits 21 and 31, the number of elements per horizontal line before transposition is doubled so that the number of vertical lines after transposition is also doubled, resulting, however, in the required memory capacity being doubled. Consequently, the pixel interpolator 33 is preferably arranged after circuit 22. The signal from transposer 22 is applied to a delay element 34 having a delay of 20 ms and to a first input of the interpolator 33. This interpolator may be formed as a median filter of known type. The delayed signal reaches a second input of filter 33 via a switching stage 35. Filter 33 causes a delay of the order of one picture element, while the line frequency and the bandwidth of the picture information remain unchanged. A multiplexer 36 makes a selection between the output signal of the interpolator 33 and the output signal of element 34. Under these circumstances the circuit of FIG. 5 comprises three field memories, namely 23, 24 and 34.

It is apparent from the foregoing that among all the modifications considered S3' (b) and (d), in which the memories have a dual function, are preferred. For reading from the memories use can be made of a clock signal having a higher frequency, which has the advantage that the active part of the vertical lines is read faster, which leads to an increase in the retrace ratio and thus to a further reduction of the energy dissipation. However, this increases the bandwidth of the picture information to be displayed.

It will be noted that the devices described with reference to FIGS. 3, 4 and 5 for the European television standard are suitable, with some modifications, for the scanning systems which have been derived from the NTSC television standard. For example, the field frequency of 60 Hz will generally not be doubled.

Calculations have proved that the energy dissipation, which with an increase of the line frequency is considerably increased in picture display devices using horizontal line scanning, is reduced in devices according to the invention. Moreover, in the known devices the dissipation is increased if the aspect ratio is increased from 4:3 to 16:9 with the same diagonal scanning angle, whereas the dissipation in a picture display device according to the invention is reduced. In an experimental set-up it was indeed ascertained that the dissipation had been reduced considerably. As compared with a device using horizontal line deflection, the losses caused by eddy currents are reduced by a factor of 1.7 to 5 in a device using vertical line deflection in accordance with the scanning system S3' the line frequency being increased from 15.625 to 18.75 kHz (European standard). The losses caused by hysteresis are reduced by a factor of 2 to 6 and the transistor losses are reduced by a factor of 1.4 to 2.4. These factors are particularly dependent on the design of the deflection coils. The losses can be further reduced in that the two deflection coils are arranged in known manner in alignment with each other around the neck of the picture display tube, rather than arranging one of the coils around the other coil. The losses are also reduced in the base drive of the line output transistor, namely by a factor of 1.6 to 3.6 and in the turns of the deflection coils, namely by a factor of 2.3 to 8.7. These values apply to a device using a 70° projection tube.

We claim:

1. A picture display device suitable for receiving and processing an incoming video signal which comprises horizontally scanned picture information and for displaying pictures which are composed of fields each of which comprises a given number of lines, said device comprising a scanning section for generating line and field scanning signals for forming the lines and fields, respectively, and a video signal processing section for processing the picture information which is present in the video signal, characterized in that the scanning section is adapted to scan the lines in the vertical direction, a plurality of vertical lines constituting a field, the vertical line frequency being many times higher, at least 200 times, than the horizontal field frequency, the video signal processing section comprising a scan direction transposition circuit for receiving the picture information and for sequentially assigning picture information to elements of the vertically scanned lines.

2. A picture display device as claimed in claim 1, further comprising a line scan generator for vertically scanning the displayed picture.

3. A picture display device as claimed in claim 2, further comprising, a modulator for multiplying horizontal and vertical scanning signals for correcting scanning errors in the displayed picture.

4. A picture display device as claimed in claim 2, wherein a line deflection coil connected to the line scan generator and a field deflection coil connected to the field scan generator are arranged in alignment with each other around the neck of a picture display tube.

5. A picture display device as claimed in claim 1, further comprising a field scan generator for horizontally scanning the displayed picture.

6. A picture display device as claimed in claim 5, comprising a picture display tube provided with electron guns and a spiral lens and stage for receiving a field scan signal and for applying a horizontal dynamic correction signal to a focusing electrode of the picture display tube.

7. A picture display device as claimed in claim 5, further comprising a modulator for multiplying horizontal and vertical scanning signals for correcting scanning errors in the displayed picture.

8. A picture display device as claimed in claim 5, wherein a line deflection coil connected to the line scan generator and a field deflection coil connected to the field scan generator are arranged in alignment with each other around the neck of a picture display tube.

9. A picture display device as claimed in claim 1, wherein the horizontal field frequency upon display is equal to the vertical field frequency in the incoming video signal, or to a small, single-digit multiple of said frequency.

10. A picture display device as claimed in claim 9, in which a line comprises picture information during the line trace time and no picture information during the line retrace time, wherein upon display the ratio between the line retrace time and the line period is at least substantially equal to the corresponding ratio in the incoming video signal.

11. A picture display device as claimed in claim 10, in which the lines comprise picture information during the field trace time and no picture information during the field retrace time, wherein upon display the ratio between the field retrace time and the field period is substantially equal to the corresponding ratio in the incoming video signal.

12. A picture display device as claimed in claim 11, further comprising first clock signal for sampling the incoming video signal and a second clock signal for controlling the scan direction transposition circuit for assigning picture information to elements of the vertical lines, the frequency of the second clock signal being substantially equal to the frequency of the first clock signal or to a small, single-digit multiple of said frequency.

13. A picture display device as claimed in claim 12, wherein the ratio between the number of vertical lines upon display and the number of horizontal lines in the incoming video signal is substantially the same as the ratio between the width and the height of the displayed picture.

14. A picture display device as claimed in claim 12, wherein the number of samples with picture information in a vertical line in the displayed picture is equal to the number of horizontal lines with picture information in the field in the incoming video signal, and in that the number of vertical lines with picture information in the displayed field is equal to the number of samples in a line in the incoming video signal.

15. A picture display device as claimed in claim 12, wherein the nominal frequency of the second clock signal is equal to an integral multiple of the line frequency in the incoming video signal and to another integral multiple of the line frequency in the displayed picture.

16. A picture display device as claimed in claim 12, wherein the scan direction transposition circuit comprises two memories and two address generators each for addressing a memory, the incoming picture information being written in a memory in the order of arrival under the control of the second clock signal during one field period, while the picture information stored in the other memory during the previous field period is being read from said memory in a direction perpendicular to the write direction.

17. A picture display device as claimed in claim 16, wherein said second clock signal is a clock signal for reading from the memories.

18. A picture display device as claimed in claim 16, characterized by a doubling of the field frequency by means of the memories.

19. A picture display device as claimed in claim 16, in which the incoming video, signal is suitable for interlaced display, further comprising a circuit for converting the incoming video signal into a non-interlaced video signal and for applying the signal obtained to the memories.

20. A picture display device as claimed in claim 19, further comprising a demultiplexing circuit for receiving the non-interlaced video signal and for alternately passing on the picture information of the picture samples of said signal to the memories via switching stage switching at field frequency.

21. A picture display device as claimed in claim 16, further comprising a pixel interpolator incorporated in the signal path of the memories for increasing the number of picture samples in the displayed picture.

22. A picture display device as claimed in claim 21, further comprising the picture element interpolator has a first input coupled to the scan direction transposition circuit, a second input coupled to the said circuit via a delay element, and an output connected to a multiplexer.

23. A picture display device as claimed in claim 9, wherein the vertical line frequency upon display is higher than, and no integral multiple of, the horizontal line frequency in the incoming video signal.

24. A picture display device as claimed in claim 23, in which a line comprises picture information during the line trace time and no picture information during the line retrace time, wherein upon display the ratio between the line retrace time and the line period is at least substantially equal to the corresponding ratio in the incoming video signal.

25. A picture display device as claimed in claim 24, in which the lines comprise picture information during the field trace time and no picture information during the field retrace time, wherein upon display the ratio between the field retrace time and the field period is substantially equal to the corresponding ratio in the incoming video signal.

26. A picture display device as claimed in claim 25, further comprising a first clock signal for sampling the incoming video signal and a second clock signal for controlling the scan direction transposition circuit for assigning picture information to elements of the vertical lines, the frequency of the second clock signal being substantially equal to the frequency of the first clock signal or to a small, single-digit multiple of said frequency.

27. A picture display device as claimed in claim 26, wherein the ratio between the number of vertical lines upon display and the number of horizontal lines in the incoming video signal is substantially the same as the ratio between the width and the height of the displayed picture.

28. A picture display device as claimed in claim 26, wherein the number of samples with picture information in a vertical line in the displayed picture is equal to the number of horizontal lines with picture information in the field in the incoming video signal, and in that the number of vertical lines with picture information in the displayed field is equal to the number of samples in a line in the incoming video signal.

29. A picture display device as claimed in claim 26, wherein the nominal frequency of the second clock signal is equal to an integral multiple of the line frequency in the incoming video signal and to another integral multiple of the line frequency in the displayed picture.

30. A picture display device as claimed in claim 26, wherein the scan direction transposition circuit comprises two memories and two address generators each for addressing a memory, the incoming picture information being written in a memory in the order of arrival under the control of the second clock signal during one field period, while the picture information stored in the other memory during the previous field period is being read from said memory in a direction perpendicular to the write direction.

31. A picture display device as claimed in claim 30, wherein said second clock signal is a clock signal for reading from the memories.

32. A picture display device as claimed in claim 30, characterized by a doubling of the field frequency by means of the memories.

33. A picture display device as claimed in claim 30, in which the incoming video signal is suitable for interlaced display, further comprising a circuit for converting the incoming video signal into a non-interlaced video signal and for applying the signal obtained to the memories.

34. A picture display device as claimed in claim 33, further comprising a demultiplexing circuit for receiving the non-interlaced video signal and for alternately passing on the picture information of the picture samples of said signal to the memories via a switching stage switching at field frequency.

35. A picture display device as claimed in claim 30, further comprising a pixel interpolator incorporated in the signal path of the memories for increasing the number of picture samples in the displayed picture.

36. A picture display device as claimed in claim 35, wherein the picture element interpolator has a first input coupled to the scan direction transposition circuit, a second input coupled to the said circuit via a delay element, and an output connected to a multiplexer.

* * * * *